United States Patent
Coggins et al.

(10) Patent No.: US 11,148,238 B2
(45) Date of Patent: Oct. 19, 2021

(54) METHOD AND APPARATUS FOR AUTOMATED VALVE SPRING ASSEMBLY

(71) Applicant: Air Way Automation, Inc., Grayling, MI (US)

(72) Inventors: Timothy P. Coggins, Traverse City, MI (US); Jack Moran, Grayling, MI (US); John Ammond, Traverse City, MI (US)

(73) Assignee: Air Way Automation, Inc., Grayling, MI (US)

( * ) Notice: Subject to any disclaimer, the term of this patent is extended or adjusted under 35 U.S.C. 154(b) by 238 days.

(21) Appl. No.: 16/546,790

(22) Filed: Aug. 21, 2019

(65) Prior Publication Data

US 2020/0061762 A1 Feb. 27, 2020

Related U.S. Application Data

(60) Provisional application No. 62/720,611, filed on Aug. 21, 2018.

(51) Int. Cl.
*B23P 19/04* (2006.01)
*F01L 3/10* (2006.01)

(52) U.S. Cl.
CPC ............ *B23P 19/045* (2013.01); *F01L 3/10* (2013.01); *F01L 2303/01* (2020.05)

(58) Field of Classification Search
CPC ....... B23P 19/045; F01L 3/10; F01L 2303/01; F01L 2301/00
See application file for complete search history.

(56) References Cited

U.S. PATENT DOCUMENTS

| | | | | |
|---|---|---|---|---|
| 3,793,999 A | * | 2/1974 | Seiler | B23P 19/045 123/90.67 |
| 6,223,426 B1 | * | 5/2001 | Kimmelmann | F01L 1/46 29/771 |
| 8,607,426 B1 | * | 12/2013 | Coggins | B23P 19/045 29/227 |

* cited by examiner

*Primary Examiner* — Lawrence Averick
(74) *Attorney, Agent, or Firm* — Price Heneveld LLP

(57) ABSTRACT

A method and apparatus for automated valve spring assembly includes a head assembly with a pair of elongated passageways that moveably support a pair of retainer keys for movement through the passageways. The head assembly including a moveable divider plate and a pair of jaws, a push member that closes off the passageways and that slides the retainer keys along opposite sides of the divider plate. The retainer keys contact surfaces of the jaws and rotate the jaws outwardly as the keys are moved by the pushrod. The retainer plate is then retracted, and the jaws shift inwardly and push or position the retainer keys on the valve stem where the retainer plate is configured to allow sequential engagement of the rings of the retainer keys to engage the valve stem.

18 Claims, 15 Drawing Sheets

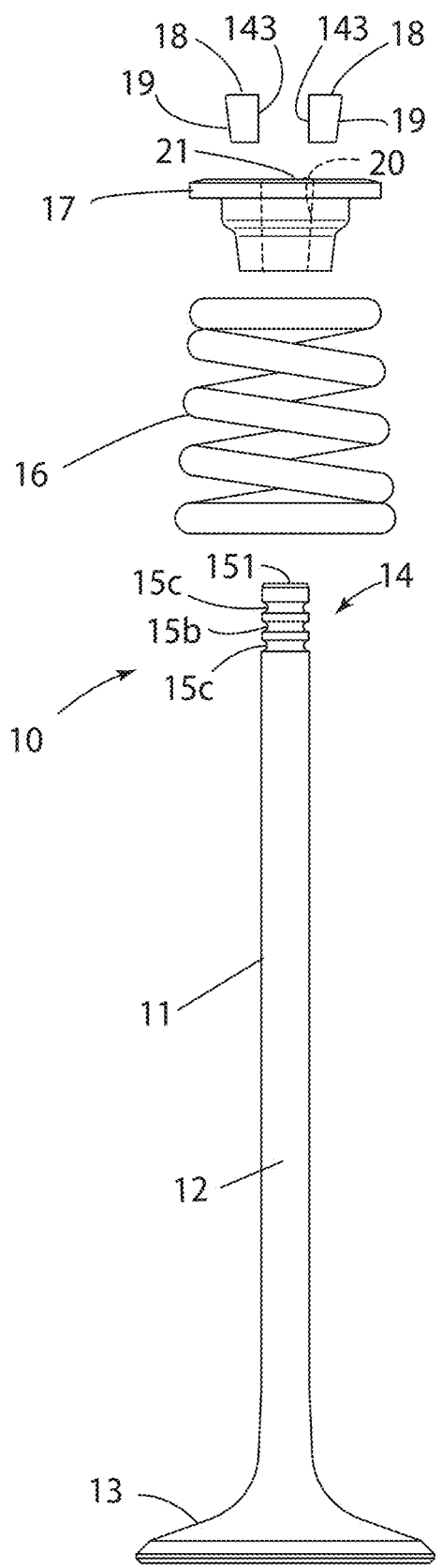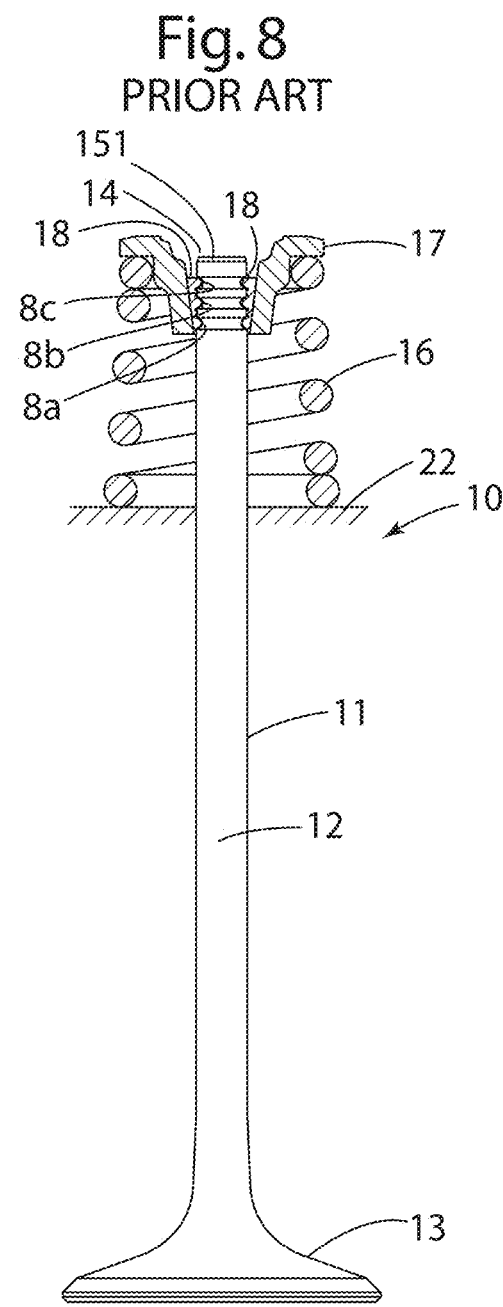
Fig. 7 PRIOR ART
Fig. 8 PRIOR ART

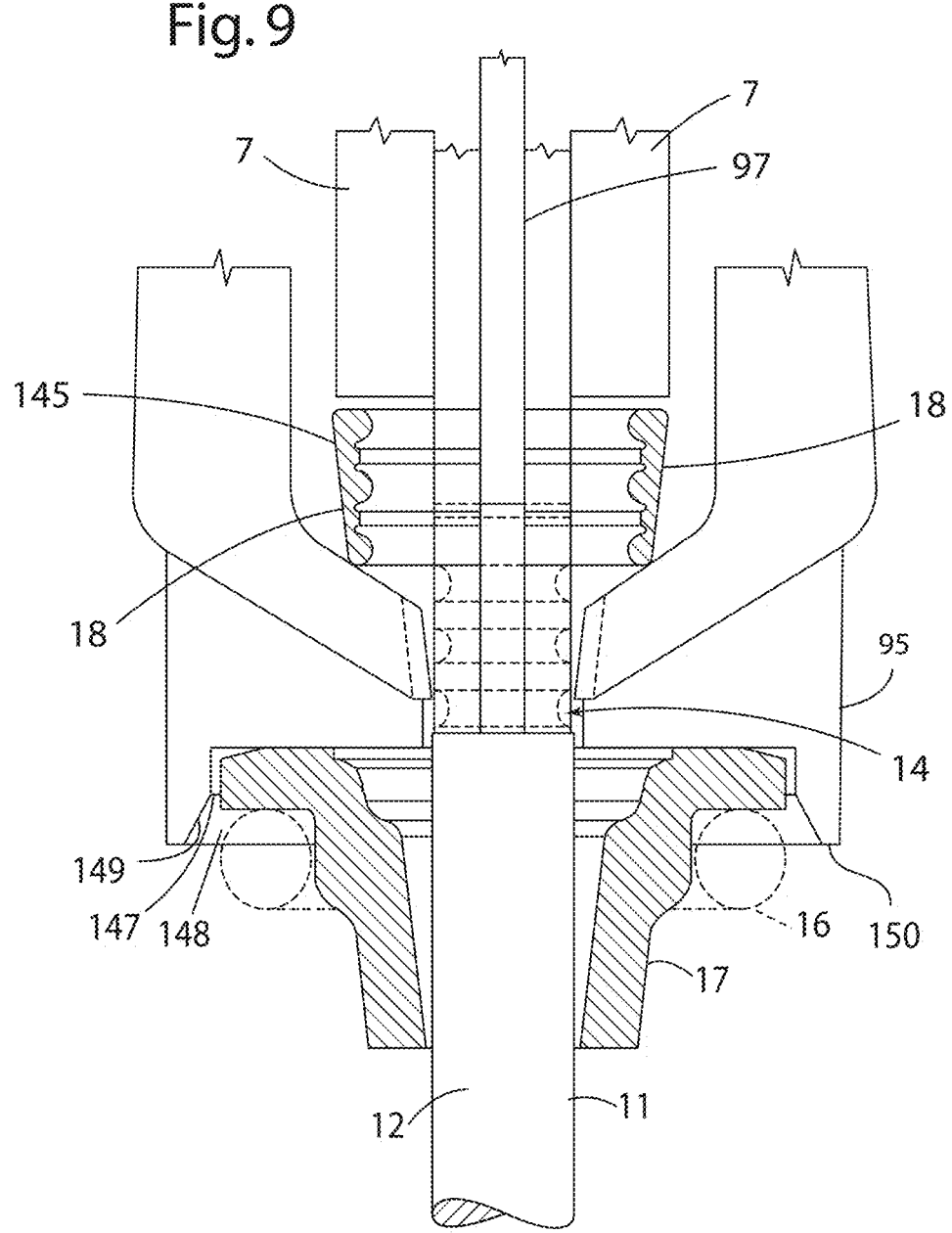

METHOD AND APPARATUS FOR AUTOMATED VALVE SPRING ASSEMBLY

BACKGROUND

Internal combustion engines commonly include poppet valves to control the flow of intake and exhaust gases through the intake and exhaust ports, respectively. Poppet valve assemblies commonly include a poppet valve having a disc portion and a stem extending from the disc. The end of the stem may include one or more annular grooves. When the valves are assembled to a cylinder head of an internal combustion engine, the valve stem is inserted through a valve guide, and a valve spring is positioned around the valve stem. A valve spring cap is positioned on an outer end of the valve spring, and valve spring keys are positioned on the valve stem in engagement with the annular grooves. The valve spring is then allowed to expand, and the valve spring cap engages the valve spring keys, pushing the valve spring keys into engagement with the grooves. The valve spring keys and valve spring cap retain the valve spring in a compressed configuration.

With reference to FIGS. 7 and 8, a prior art poppet valve assembly 10 of the type used in internal combustion engines includes a valve 11 having a stem 12 and a valve disc portion 13. An end 14 of the stem 12 includes a plurality of annular grooves 15a, 15b, 15c. The valve assembly 10 further includes a helical coil spring 16, a valve spring cap 17, and a pair of valve stem keys 18. Outer surfaces of the valve stem keys 18 form a truncated cone that wedges tightly against the tapered sidewalls 20 of an opening 21 of the valve spring cap 17 when assembled with the valve spring 16 in a compressed state acting against a surface 22 of a cylinder head. Inner surfaces of the valve stem keys 18 include a plurality of engagement rings, including a first rings 8a, 8b and 8c configured to respectively engage the grooves 15a, 15b, 15c.

Various devices have been developed to assist in assembling poppet type valves for internal combustion engines. However, known tools and devices may suffer from various drawbacks.

SUMMARY

One aspect of the present invention is a device or tool for assembling a device for assembling valve springs to a cylinder head of an internal combustion engine, the device includes a head assembly including upper and lower ends and defining an axis extending between the upper and lower ends, wherein the lower end is configured to compress a valve spring on a cylinder head to permit assembly of a spring retainer cap and retainer keys to a valve of the cylinder head. The head assembly includes a support structure, a pair of elongated passageways configured to moveably support a pair of retainer keys for movement of the retainer keys from first ends of the passageways to second ends that are located adjacent the lower end of the head assembly, a divider plate moveably interconnected with the support structure for powered reciprocating movement between extended and retracted positions, the divider plate having a lower end defining oppositely facing guide surfaces that are configured to moveably support a pair of retainer keys in spaced apart locations that permit an end of a valve to be positioned between the retainer keys when the divider plate is in the extended position, a pair of jaws moveably connected to the support structure, the jaws having end portions that are selectively movable between inward and outward positions, wherein the end portions are biased towards the inward position, and wherein the end portions define inwardly-facing key-engagement surfaces configured to engage curved outer surfaces of a pair of retainer keys to push the retainer keys towards one another onto a valve stem upon movement of the divider plate from the extended position to the retracted position. The head assembly further includes a powered actuator and a push member operably connected to the powered actuator for powered movement between extended and retracted positions, wherein the push member is configured to engage a pair of retainer keys and move the retainer keys along portions of the passageways adjacent the second ends as the push member moves from the retracted position to the extended position, wherein at least one of the retainer keys and the push member engage and shift the jaws outwardly as the push member moves to the extended position, and wherein the divider plate is configured to be retracted from a first position where the retainer keys are spaced from the valve stem, to a second position where an inwardly-extending first ring of each of the retainer keys engages a groove of the valve stem, and the divider plate prevents an inwardly-extending second ring of each of the retainer keys spaced from the first ring from engaging a second groove of the valve stem spaced from the first groove, to a fully retracted position where the second ring of each of the retainer keys engages the second groove of each of the valve stems.

Another aspect of the present invention is a device of tool for assembling a device for assembling valve springs to a cylinder head of an internal combustion engine, the device includes a head assembly including upper and lower ends and defining an axis extending between the upper and lower ends, wherein the lower end is configured to compress a valve spring on a cylinder head to permit assembly of a spring retainer cap and retainer keys to a valve of the cylinder head. The head assembly includes a support structure, a pair of elongated passageways configured to moveably support a pair of retainer keys for movement of the retainer keys from first ends of the passageways to second ends that are located adjacent the lower end of the head assembly, a divider plate moveably interconnected with the support structure for powered reciprocating movement between extended and retracted positions, the divider plate having a lower end defining oppositely facing guide surfaces that are configured to moveably support a pair of retainer keys in spaced apart locations that permit an end of a valve to be positioned between the retainer keys when the divider plate is in the extended position, a pair of jaws moveably connected to the support structure, the jaws having end portions that are selectively movable between inward and outward positions, wherein the end portions are biased towards the inward position, and wherein the end portions define inwardly-facing key-engagement surfaces configured to engage curved outer surfaces of a pair of retainer keys to push the retainer keys towards one another onto a valve stem upon movement of the divider plate from the extended position to the retracted position. The head assembly further includes a powered actuator and a push member operably connected to the powered actuator for powered movement between extended and retracted positions, wherein the push member is configured to engage a pair of retainer keys and move the retainer keys along portions of the passageways adjacent the second ends as the push member moves from the retracted position to the extended position, wherein the divider plate is configured to allow a plurality of inwardly-facing rings of each of the retainer keys to sequentially engage a plurality of grooves of the valve stem as the divider plate is moved from the extended positon to the retracted position and the retainer keys are shifted inwardly toward one another by jaws.

These and other features, advantages and objects of the present embodiments as disclosed herein will be further understood and appreciated by those skilled in the art by reference to the following specification, claims and appended drawings.

BRIEF DESCRIPTION OF THE DRAWINGS

FIG. 7 is an exploded view of a prior art poppet valve assembly;

FIG. 8 is a prior art poppet valve assembly in the assembled condition;

FIG. 9 is a partially fragmentary cross-sectional view of a portion of the device of FIG. 4 taken along the line 9-9 showing the jaws in an inner position;

DETAILED DESCRIPTION OF THE PREFERRED EMBODIMENTS

Figure 1:
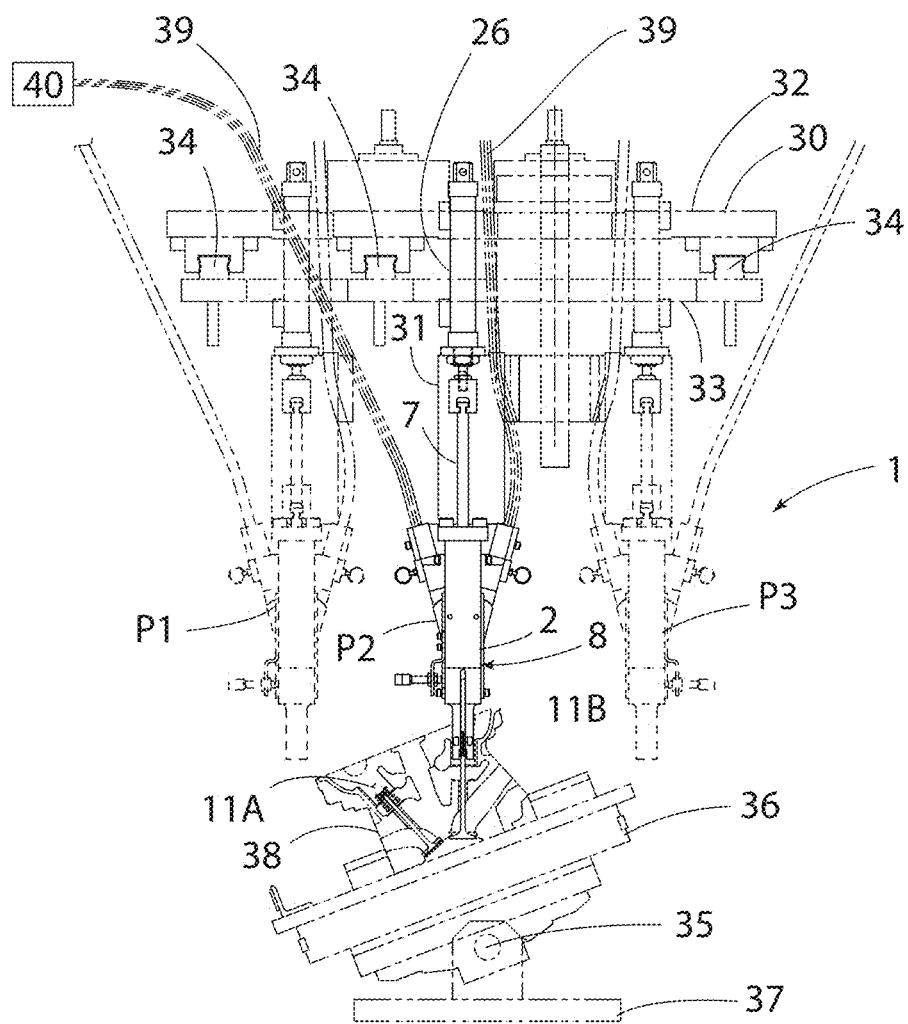
FIG. 1 is a partially schematic side elevational view of a device for assembling poppet valve assemblies according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 2:
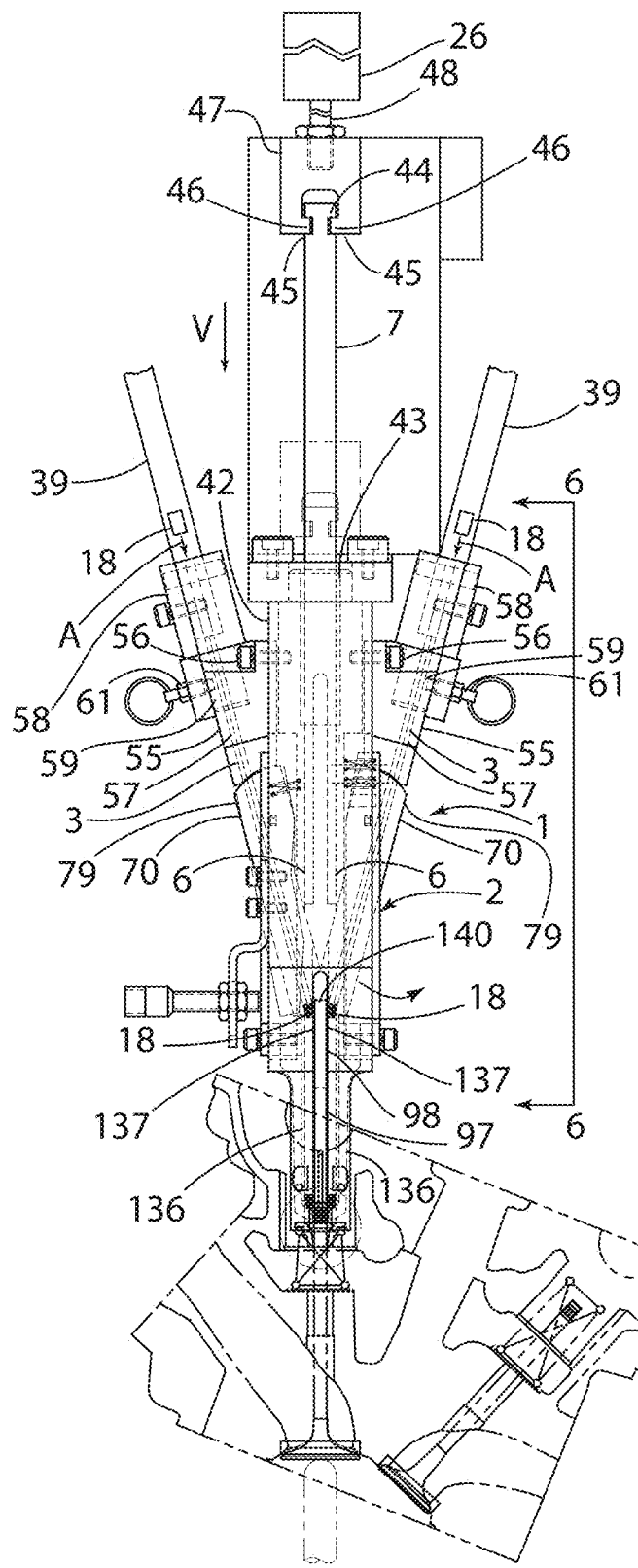
FIG. 2 is an enlarged view of a portion of the device of FIG. 1.

With reference to FIGS. 1 and 2, a device 1 according to a first embodiment includes a body structure 2 defining a pair of elongated passageways 3 that are configured to moveably support key components 18 for guided movement through the passageways 3 in the direction of the arrows "A." As discussed in more detail below in connection with FIGS. 9 and 10A, the passageways 3 define open lower ends 5, and the valve stem keys 18 are pushed out of the open ends 5 by lower ends 6 of a pushrod 7.

The device 1 also includes first and second jaws 4 that are moveably connected to the body structure 2. The jaws 4 include key-engaging surfaces 25 that move towards and away from each other as indicated by the arrows "B" (FIGS. 9-10C) between an outer engaged position (FIG. 10A) in which the key-engaging surfaces 25 contact valve stem keys 18, and an inner disengaged position (FIG. 9). The jaws 4 are biased inwardly towards the disengaged position of FIG. 9. A pushrod 7 is connected to a pneumatic cylinder 26 (FIG. 1) that shifts the pushrod 7 in a vertical first direction "V" (FIG. 2) to thereby push the valve stem keys 18 through elongated passageways 3. End portions 27 of elongated passageways 3 are disposed adjacent the key-engaging surfaces 25 of the jaws 4. Movement of the pushrod 7 causes the jaws 4 to rotate from the disengaged position (FIG. 9) outwardly towards the engaged position (FIG. 10A). The ends 6 of the pushrod 7 push the first and second valve stem key halves 18 out of the open lower ends 5 of the elongate passageways 3 into engagement with the key-engaging surfaces 25 of the jaws 4, and the jaws 4 push the split key components 18 inwardly towards an installed position in engagement with the end 14 of the valve stem 12.

Referring again to FIG. 1, the body structure 2 forms a part of the head assembly 8. The head assembly 8 is mounted to a support assembly 30 by a bracket 31. The support assembly 30 may include upper and lower plates 32 and 33, respectively that are moveably interconnected by one or more linear guides 34 and powered actuators (not shown) to move the head assembly 8 between positions "P1," "P2," and "P3." The support assembly 30 is configured to raise and lower the head assembly 8. A cylinder head 38 is mounted to a fixture 36 that is rotatably mounted to a base 37 for movement about an axis 35. The fixture 36 may comprise a known fixture design, and it will therefore not be described in detail herein.

The overhead support assembly 30 may be configured to provide forward powered movement of the head assembly 8 in a direction that is parallel to the axis 35 to thereby move the head assembly 8 along the cylinder head 38 to align the head assembly 8 with successive combustion chambers and valves in the cylinder head 38. Also, a plurality of head assemblies 8 may be connected to the support assembly 30 to thereby simultaneously install a plurality of valve stem keys 18 in a cylinder head 38, as further described below. In the illustrated example, the cylinder head 38 includes a plurality of intake valves 11A, and a plurality of exhaust valves 11B. The fixture 36 and the cylinder head 38 may be rotated about the axis 35 to selectively align either the intake valve 11A or the exhaust valve 11B with the head assembly 8. The elongated passageways 3 in the body structure 2 are connected to elongated flexible lines 39. The flexible lines 39 are made of a polymer material according to a known design, and they may be connected to an automated feed system 40 that supplies the valve stem keys 18 to the head assemblies 8 through the flexible lines 39. The automated feed system 40 may be a known commercially available unit.

The body structure 2 (FIGS. 4 and 5) includes a main block 42 having an elongated central passageway 43 that slidably receives the pushrod 7. An upper end 44 of the pushrod 7 includes a pair of grooves 45 that receive ends 46 of a connecting shaft 48 of the pneumatic cylinder 26 that is connected to the connecting block 47 to thereby provide for powered reciprocating motion of the pushrod 7. A lower end 49 of the pushrod 7 includes an elongated slot 50 that forms a pair of lower ends 6. The pushrod 7 is fragmented in FIG. 5, and lower end 49 of the pushrod 7 is shown removed from passageway 43.

Figure 3:
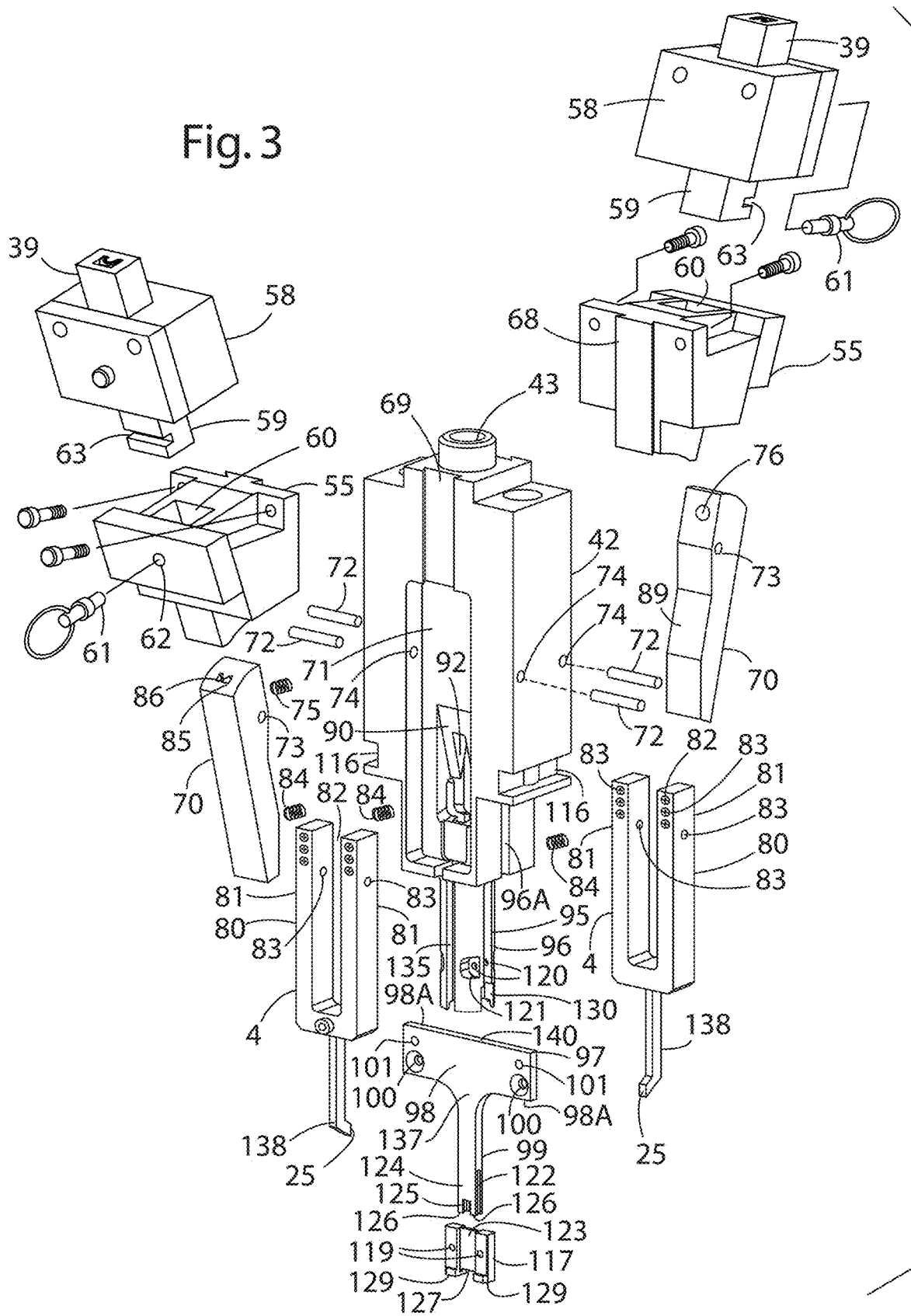
FIG. 3 is an exploded isometric view of several elements of the device.

Referring again to FIGS. 2 and 3, a pair of support blocks 55 are removably attached to the main block 42 by threaded fasteners 56. An intermediate portion 57 of elongated passageways 3 is formed in the support blocks 55. A pair of outer blocks 58 include extensions 59 that are received in openings 60 of the support blocks 55. Spring-loaded pins 61 are mounted in the openings 62 of the support blocks 55. When assembled, the pins 61 engage grooves 63 on the extensions 59 of the outer blocks 58 to thereby retain the outer blocks 58 to the support blocks 55. The extensions 59 are closely received in the openings 60 in the support blocks 55 to thereby insure that the intermediate portions 57 of the elongated passageways 3 are aligned with upper portions 66 of the elongated passageways 3 formed in outer blocks 58. Plates 64 are secured to the outer blocks 58 by threaded fasteners 65 to thereby clamp and retain the flexible lines 39 to the outer blocks 58. An outer or upper portion 66 of the elongated passageways 3 is formed in the outer blocks 58. The support blocks 55 include dove tail extensions 68 which are slidably received in dove tail grooves 69 formed in the main block 42 to thereby insure that the support blocks 55 are properly positioned on the main block 42.

Figure 4:
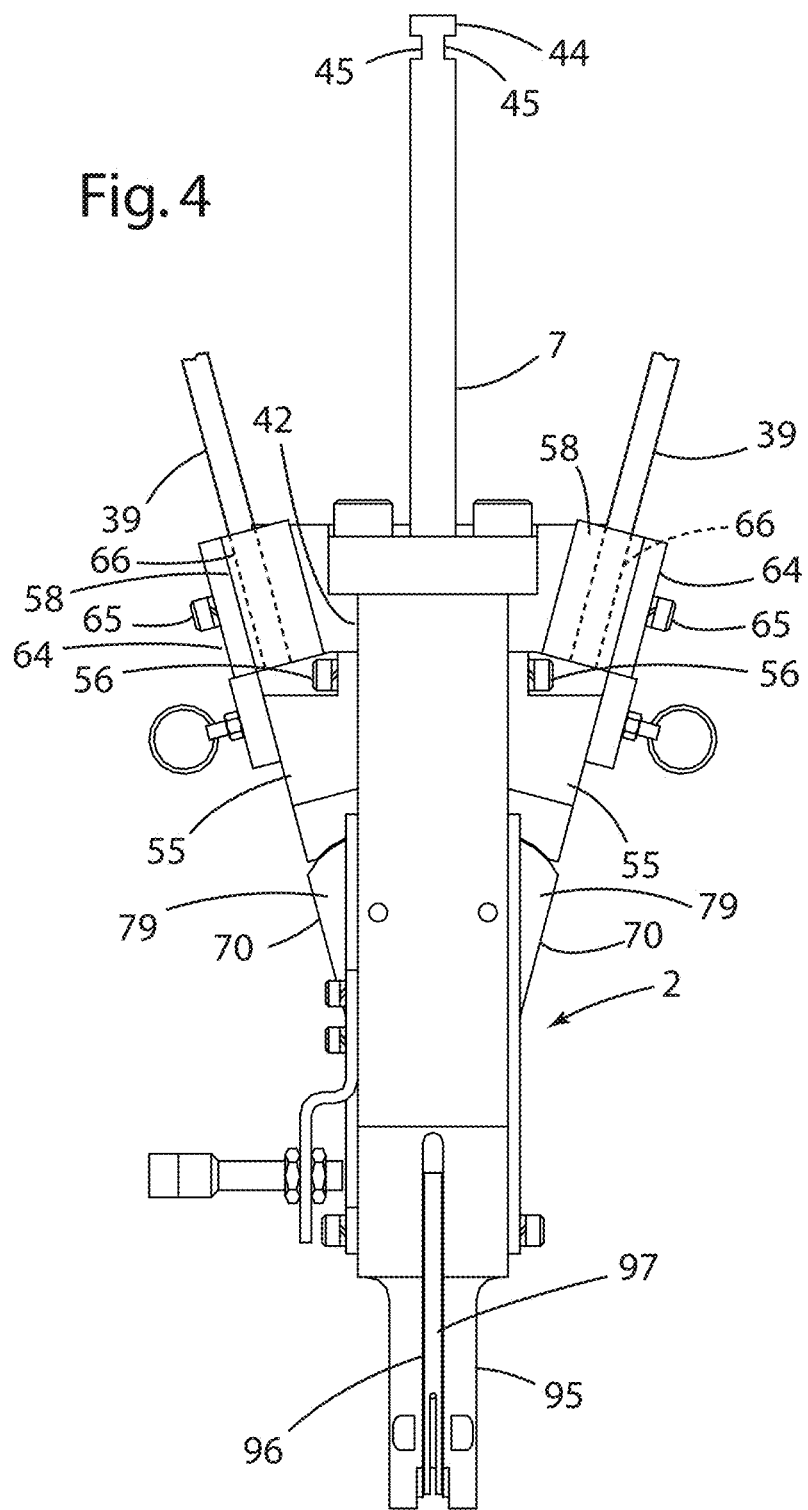
FIG. 4 is a side elevational view of the device of FIG. 2.
Figure 5:
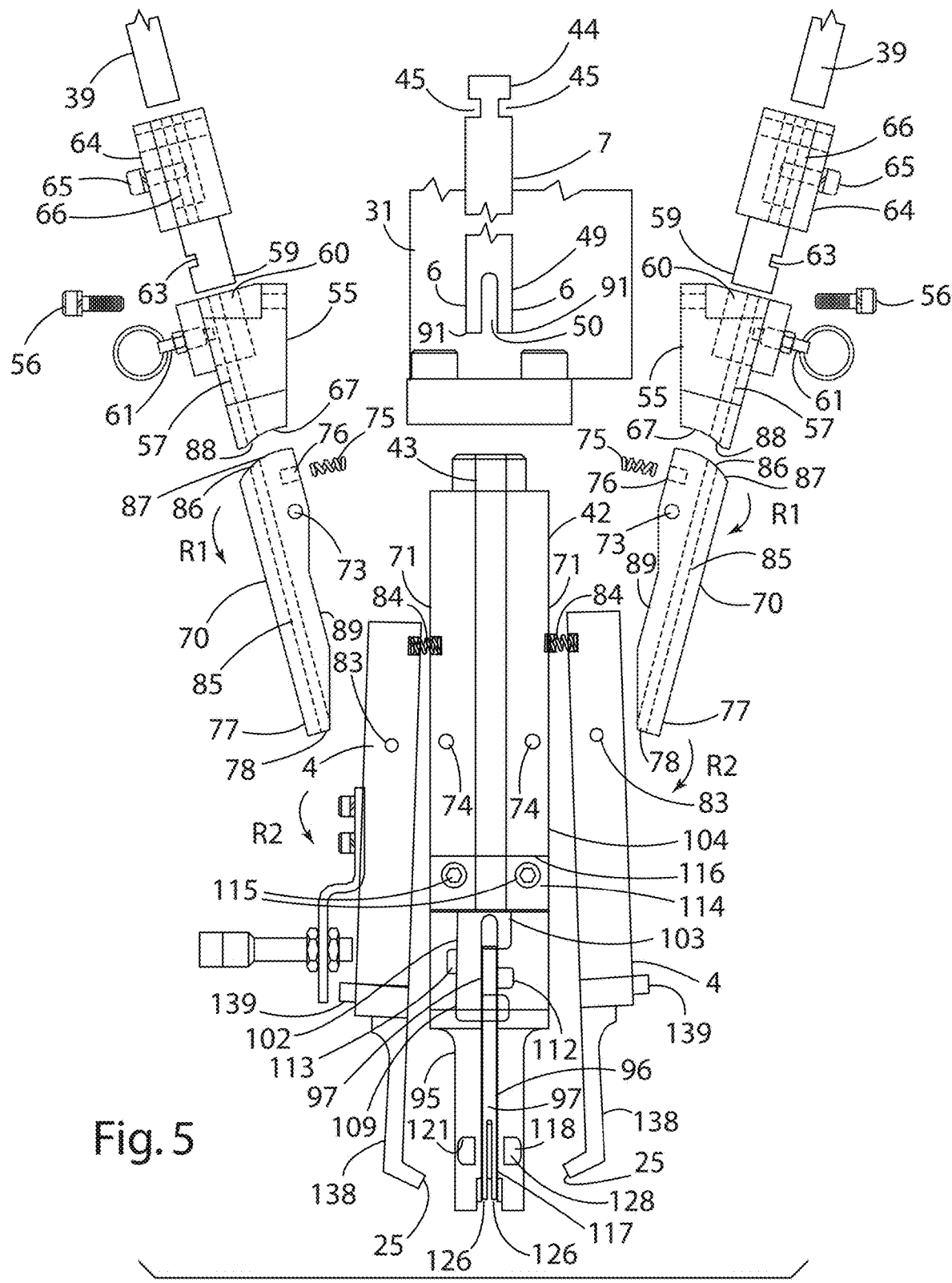
FIG. 5 is an exploded view of the device of FIG. 1.

Referring to FIGS. 4 and 5, a pair of guide members 70 are pivotally mounted to the main block 42 by pins 72 which are received in openings 73 (FIG. 5) in the guide members 70 and openings 74 in the main block 42. When assembled, the guide members 70 are positioned in pockets 71 (see also FIG. 3) formed in the main block 42.

The jaws 4 (FIG. 6) include U-shaped upper portions 80 including spaced apart upwardly-extending legs 81 and a gap 82 between the legs 81. When assembled, lower ends 77 of the guide members 70 are disposed in the gap 82 between the legs 81 of the jaws 4, with a small upper portion 79 (FIG. 4) of the guide members 70 protruding outwardly from the main block 42. The U-shaped upper portions 80 of the jaws 4 are also disposed in the pockets 71 of the main block 42 when assembled, and the pins 72 extend through the openings 83 in the upwardly extending legs 81 of the jaws 4 to thereby pivotably interconnect the jaws 4 with the main block 42. Springs 75 are received in pockets 76 formed in the guide members 70 to thereby rotatably bias the guide members 70 in the direction of the arrows "R1" (FIG. 5), thereby biasing the lower ends 77 of the guide members 70 inwardly towards the main block 42. Similarly, springs 84 are received in pockets 83 in the upwardly extending legs 81 of the jaws 4 to thereby rotationally bias the jaws 4 in the direction of the arrows "R2" (FIG. 5). The springs 84 thereby bias the key-engaging surfaces 25 of the jaws 4 toward one another.

The elongated passageways 3 include portions 85 that are formed in the guide members 70. The portions 85 of the passageways 3 include open upper ends 86 formed in curved upper surfaces 87 of the guide members 70. When the pushrod 7 is in a raised position, the springs 75 bias the guide members 70 such that the inner surfaces 89 of the guide members 70 contact angled surfaces 90 in the pockets 71 of the main block 42, thereby limiting rotation of the guide members 70 and retaining the guide member 70 in a rest position. When the guide members 70 are in the rest position, the open upper end 86 of passageways 3 are aligned with lower openings 88 of the passageways 3, thereby permitting the valve stem keys 18 to slide from the intermediate portion of internal passageway portion 57 in the support blocks 55 into the passageway portions 85 in the guide members 70. However, as the pushrod 7 is moved downwardly, outer corners 91 of the lower ends 6 of the pushrod 7 contact inner surfaces 89 of the guide members 70 as the corners 91 move out of opening 92 (FIG. 4) at the lower end of elongated central passageway 43 in the main block 42. As the outer corners 91 of the pushrod 7 slide along the inner surfaces 89 of the guide members 70, the guide members 70 rotate in a direction opposite the arrows "R1" (FIG. 5) to an outer or actuated position and the lower ends 77 of the guide members 70 rotate outwardly. Rotation of the guide members 70 causes the open upper end 86 of the passageway portion 85 to move such that it is no longer aligned with the lower opening 88 of the passageway portion 57 in the support blocks 55. When the guide members 20 are in the outer, actuated position, the upper surfaces 87 of the guide members 70 block the openings 88 of the passageway portions 57, thereby selectively blocking/preventing the keys 18 from entering the portions 85 of passageways 3 in the guide members 70. The keys 18 therefore enter the portions 85 of the passageways 3 one at a time each time the pushrod 7 is shifted downwardly.

Figure 11:
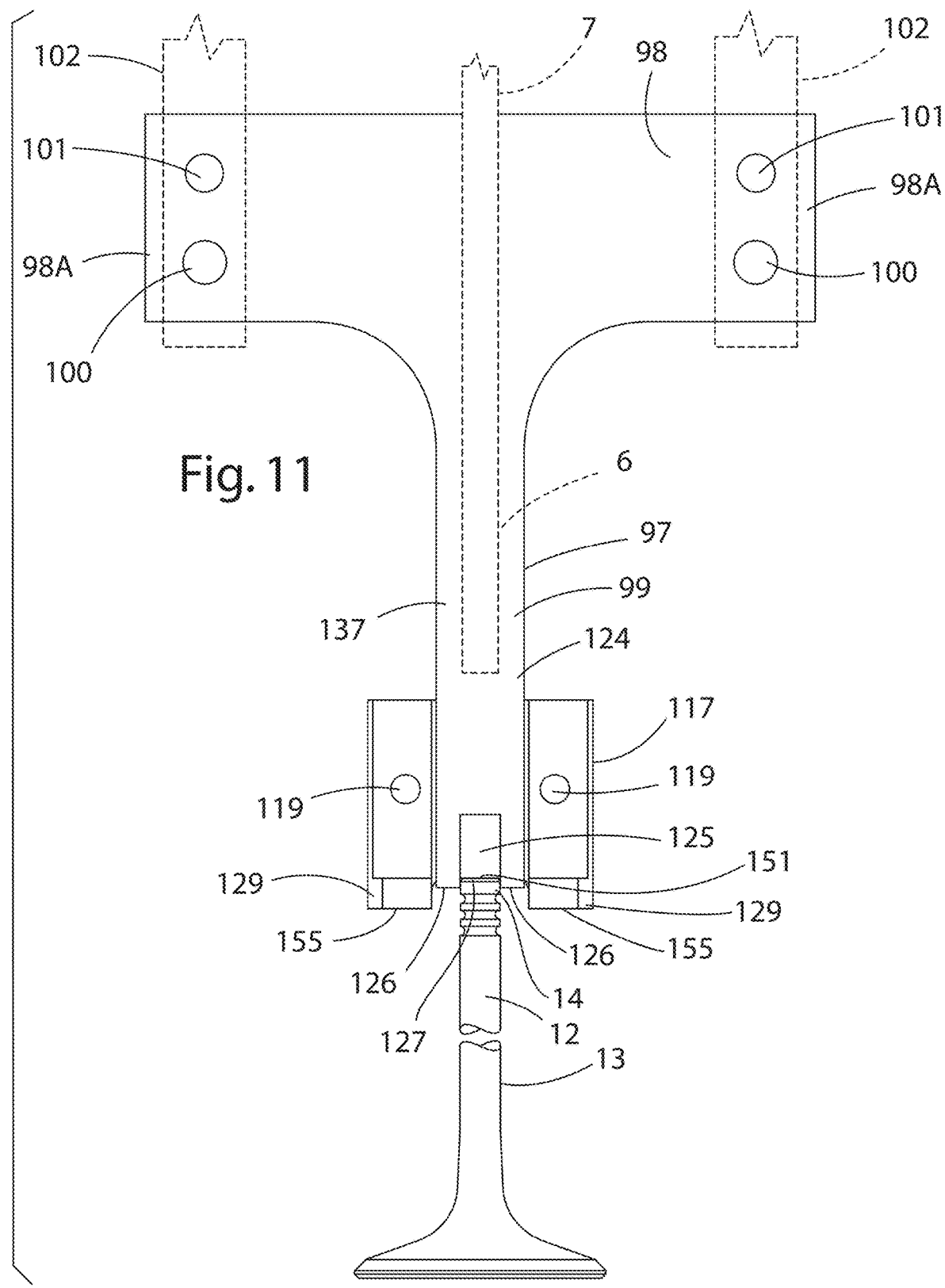
FIG. 11 is a partially fragmentary view of a removable insert that forms a portion of passageways along which valve stem keys travel.

The main block 42 includes a lower extension 95 that has a generally cylindrical shape. A slot 96 in the extension 95 receives a guide or separator plate 97. Referring to FIG. 11, the separator/guide plate 97 is generally T-shaped, with an upper transverse portion 98, and an elongated downwardly extending center portion 99. The transverse upper portion 98 of the separator/guide plate 97 includes opposite end portions 98A. The opposite end portions 98A include first openings 100 and second openings 101. A pair of pushrods or bars 102 (FIG. 6) are moveably disposed in openings or bores 103 extending along outer side portions 104 of the main block 42. The bores 103 may be configured to guide the bars 102 to provide linear reciprocating motion of the bars 102. Also, an electrical or pneumatic powered actuator may be operably connected to the bars 102 to selectively shift the bars 102 and the separator/guide plate 97 relative to the main block 42. Also, the springs 134 (FIG. 6) may be positioned inside the main block 42 to bias the rods 102 and the separator/guide plate 97 upwardly, and compressed air may be selectively applied to cylindrical cavities 133 in the main block 42 to overcome the upward bias generated by the springs 134. The bars 102 are generally cylindrical, and include an upper disc or stop portion 105 that bears against a spacer 106. The spacers 106 may comprise washers that are secured to the main block 42 utilizing threaded fasteners 108 that are received in threaded openings in the main block 42. The spacers 106 bear against an upper surface 107 of the main block 42. The discs or stop portions 105 of the bars 102 limit the downward travel of the bars 102, and also provide a structure to grip or pry against to pull the bars 102 out of the main block 42 if necessary.

Figure 6:
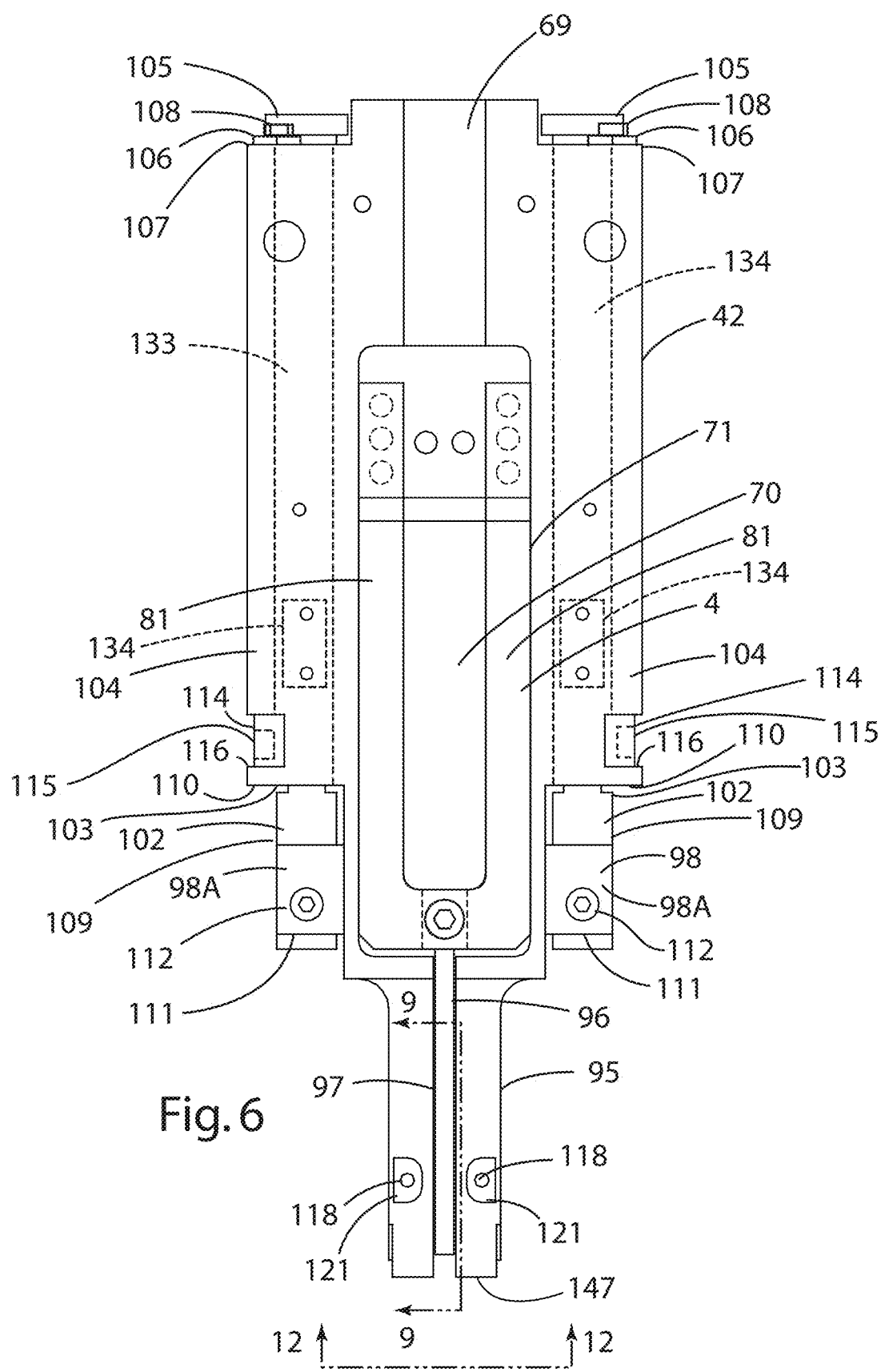
FIG. 6 is a side elevational view of the device of FIG. 2 taken along the line 6-6.

Referring to FIG. 6, lower ends 109 of the bars 102 protrude from a lower surface 110 of the main block 42. The lower ends 109 of the bars 102 include slots 111 having a width that is substantially equal to the height of the end portions 98A of the upper transverse portion 98 of the separator/guide plate 97. First, threaded fasteners 112 extend through the first openings 100 in opposite ends 98A of the upper transverse portion 98 of the separator/guide plate 97 and into threaded openings (not shown) in the lower ends 109 of the bars 102 to thereby secure the guide plate 97 to the bars 102. Second threaded fasteners 113 are threadably received in threaded openings in the lower ends 109 of the bars 102. The second threaded fasteners 113 include ends (not shown) that engage the second openings 101 (FIG. 4) in opposite ends 98A of the transverse portion 98 of the separator/guide plate 97 to thereby locate and retain the separator/guide plate 97 relative to the bars 102. A pair of bars or plates 114 are received in slots 116 of the outer side portions 104 of the main block 42. Threaded fasteners 115 secure the plates or bars 114 to the main block 42. The plates or bars 114 optionally bear against the rods or bars 102 to thereby guide the bars 102 to prevent unwanted movement of the bars 102 relative to the main block 42 that might otherwise result from clearance between the bars 102 and the openings 103 through the main block 42. As discussed in more detail below, in operation a powered actuator (pneumatic) selectively raises and lowers the bars 102 and the separator/guide plate 97 to selectively retain the keys 18 in separated positions or state prior to installation of the keys 18 on the valve stems 12.

An insert 117 (FIG. 3) includes a central web or wall 123 that is received in a slot 122 at a lower end 124 of the center portion 99 of the separator/guide plate 97. The insert 117 also includes enlarged side portions 129 that are received in pockets 130 of the extension 95 of the main block 42 when assembled (see also FIGS. 12 and 13). The separator/guide plate 97 and the insert 117 are installed to the main block 42 by inserting the separator/guide plate 97 and the insert 117 into the slot 96 in the extension 95 of the main block 42. Pins 118 extend through openings 119 in the insert 117, and through openings 120 in the extension 95 of the main block 42 to thereby securely position the insert 117. The pins 118 are conventional hardened pins having C-clips (not shown) positioned in grooves in the pins 118. The C-clips are disposed in pockets 121 of the extension 95 of the main block 42.

Referring again to FIG. 3, the lower end 124 of the separator/guide plate 97 includes slots 125 (see also FIG. 11) in addition to slots 122. The slots 122 and 125 together form four downwardly-extending prongs 126 (FIG. 5). When the insert 117 is assembled with the guide plate 97, the prongs 126 extend beyond a lower edge 127 of the central web 123 of the insert 117.

Figure 12:
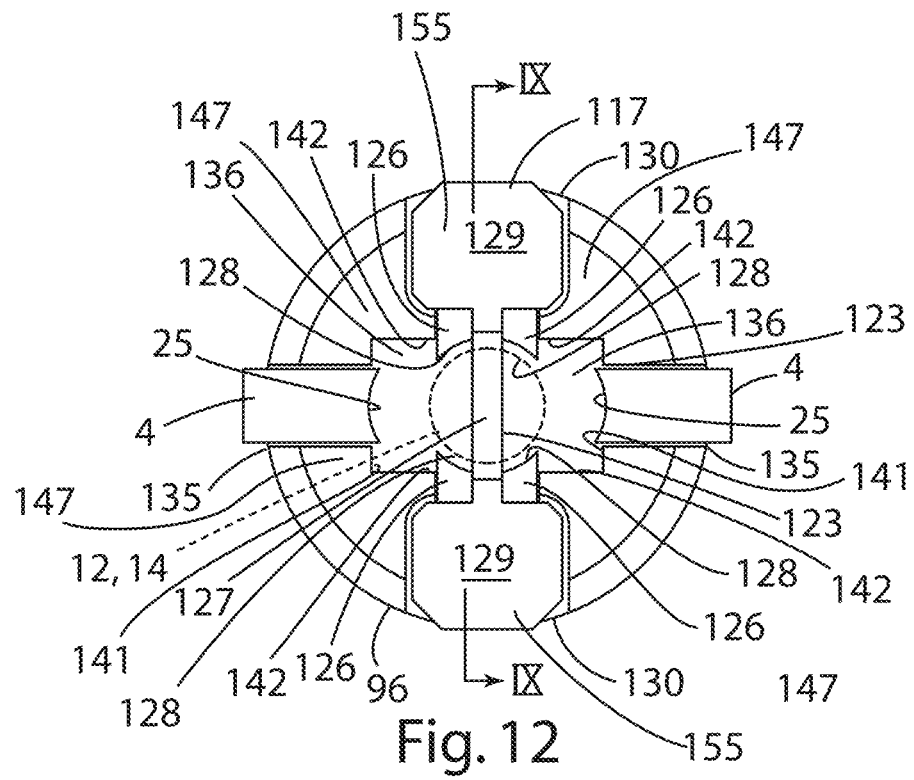
FIG. 12 is an enlarged view of the end of the device of FIG. 4 showing the jaws in the inner, disengaged position.
Figure 13:
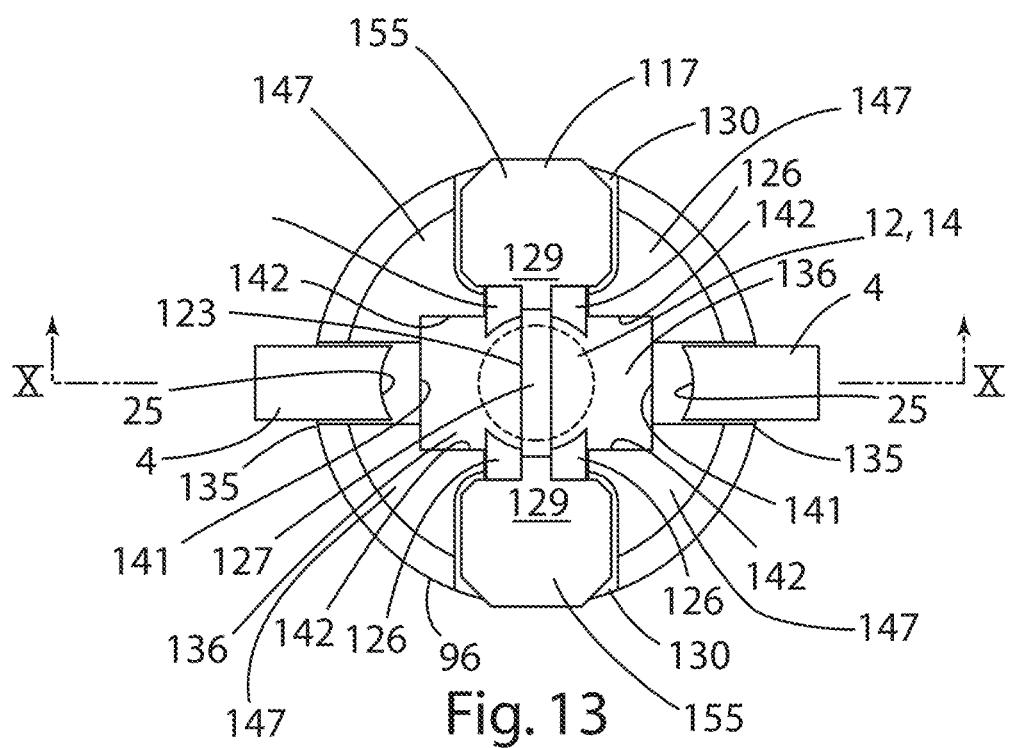
FIG. 13 is an end view of the device of FIG. 12 showing the jaws in the outward position.
Figure 14:
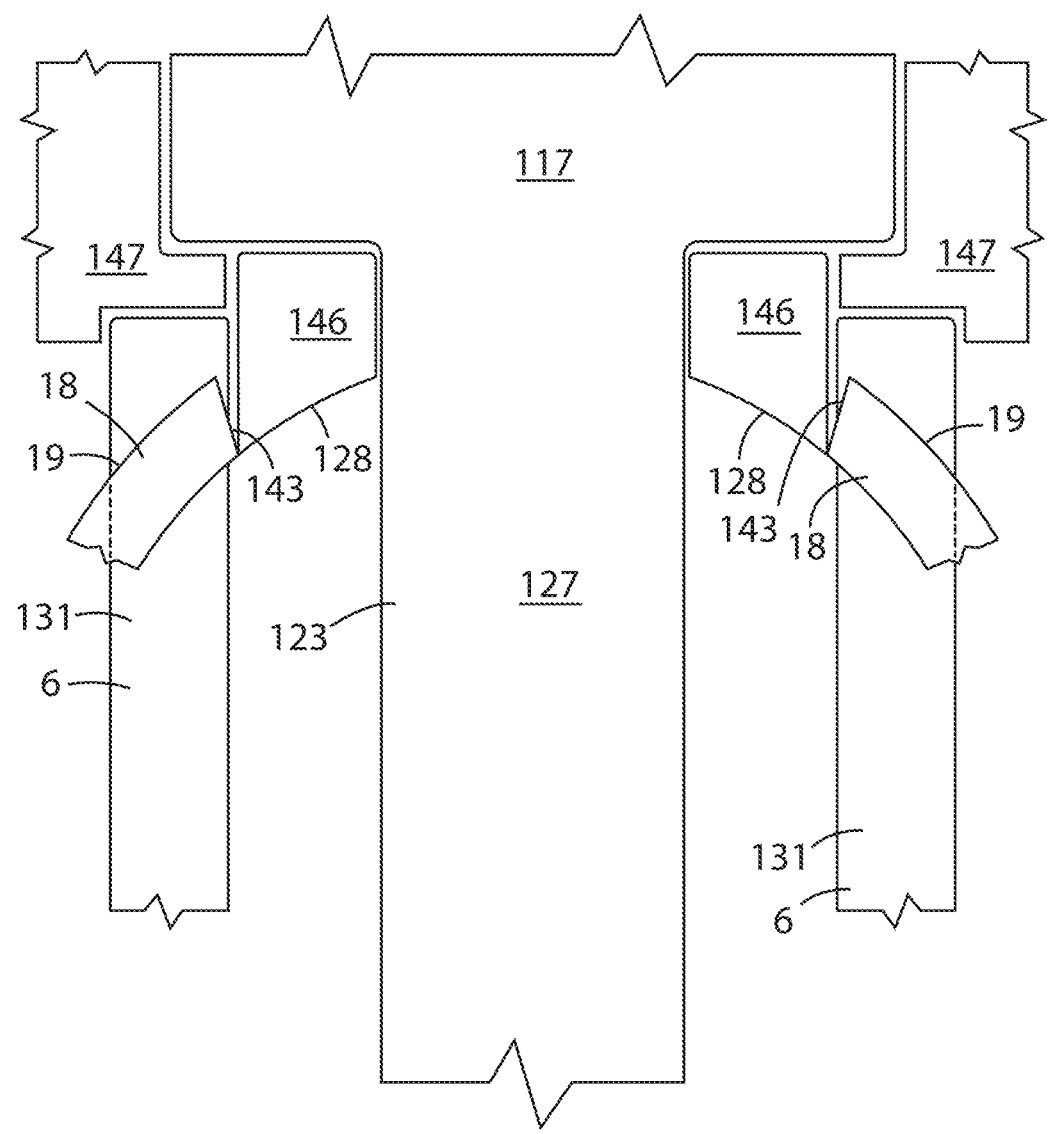
FIG. 14 is an enlarged view of a portion of the device of FIGS. 12 and 13.
Figure 15:
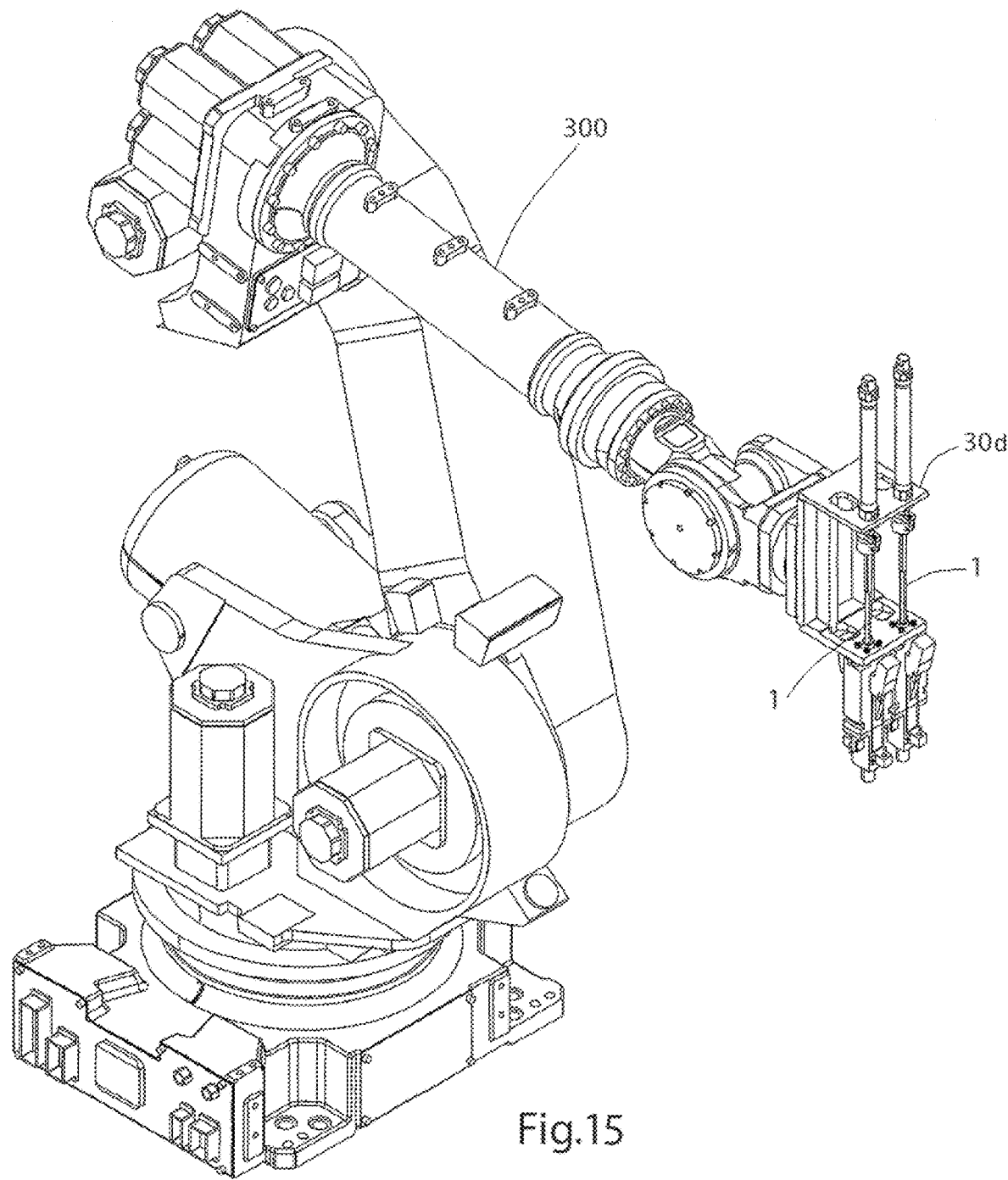
FIG. 15 is a perspective view of an embodiment of the device configured to simultaneously assemble multiple poppet valve assemblies, and which is supported on a six-axis robot.

With further reference to FIGS. 12-14, the prongs 126 include inner surfaces 128. The inner surfaces 128 are preferably cylindrical, and correspond to the shape of the end 14 of the stem 12 to thereby locate and guide the valve stem 12 when the valve stem 12 is in contact with surfaces 128 during operation. Although the surfaces 128 of the prongs 126 are preferably cylindrical, the surfaces 128 could be planar, or could have other shapes that guide and/or support the valve stem 12. End surfaces 131 of the lower ends 6 of the pushrod 7 are positioned directly adjacent to the prongs 126, and contact the valve key parts 18 to push them through the lower portions 136 of the elongated passageways 3. Referring again to FIG. 11, the end surface 14 of the valve stem 12 abuts the lower edge 127 of the central web 123 of the insert 117 when a valve 13 is in position immediately prior to installation of the valve stem keys 18 onto the valve 13. In this way, the central web 123 of the insert 117 and the prongs 126 serves to center the valve stem 12, and to positively locate the valve 13 vertically relative to the head assembly 8.

The key-engaging surfaces 25 of the jaws 4 are preferably cylindrical, and have a shape that closely corresponds to outer surfaces 18A of the key components 18.

Referring again to FIG. 5, end portions or pieces 138 of the jaws 4 may comprise separate components that are secured to the U-shaped upper portions 80 of the jaws 4 utilizing threaded fasteners 139. The end pieces 138 may be configured to grasp/guide the keys 18 of various sizes. Thus, the jaws 4 can be readily configured or reconfigured for the keys 18 of different sizes by changing out the end pieces 138 for different end pieces 138 configured for the particular size/design of the keys 18 being used.

Referring to FIGS. 2 and 5, the open lower ends 78 of the passageway portions 85 in the guide members 70 are positioned immediately adjacent outer surfaces 137 of the guide plate 97 immediately adjacent an upper edge 140 of the separator/guide plate 97 when the guide members 70 are rotated outwardly by the ends 6 of the pushrod 7. Lower ends 136 of the passageways 3 are defined by inwardly facing surfaces 141, 142 that are formed in the downwardly extending portion 95 of the main block 42, and the outwardly facing side surfaces 137 of the separator/guide plate 97. The key components 18 are disposed in the passageway 136 with edges 143 (see also FIG. 7) of the keys 18 in sliding contact with the outer surface 137 of the separator/guide plate 97. The key components 18 may also be positioned/guided by surfaces 141, 142 formed in the main block 42.

Figure 10A:
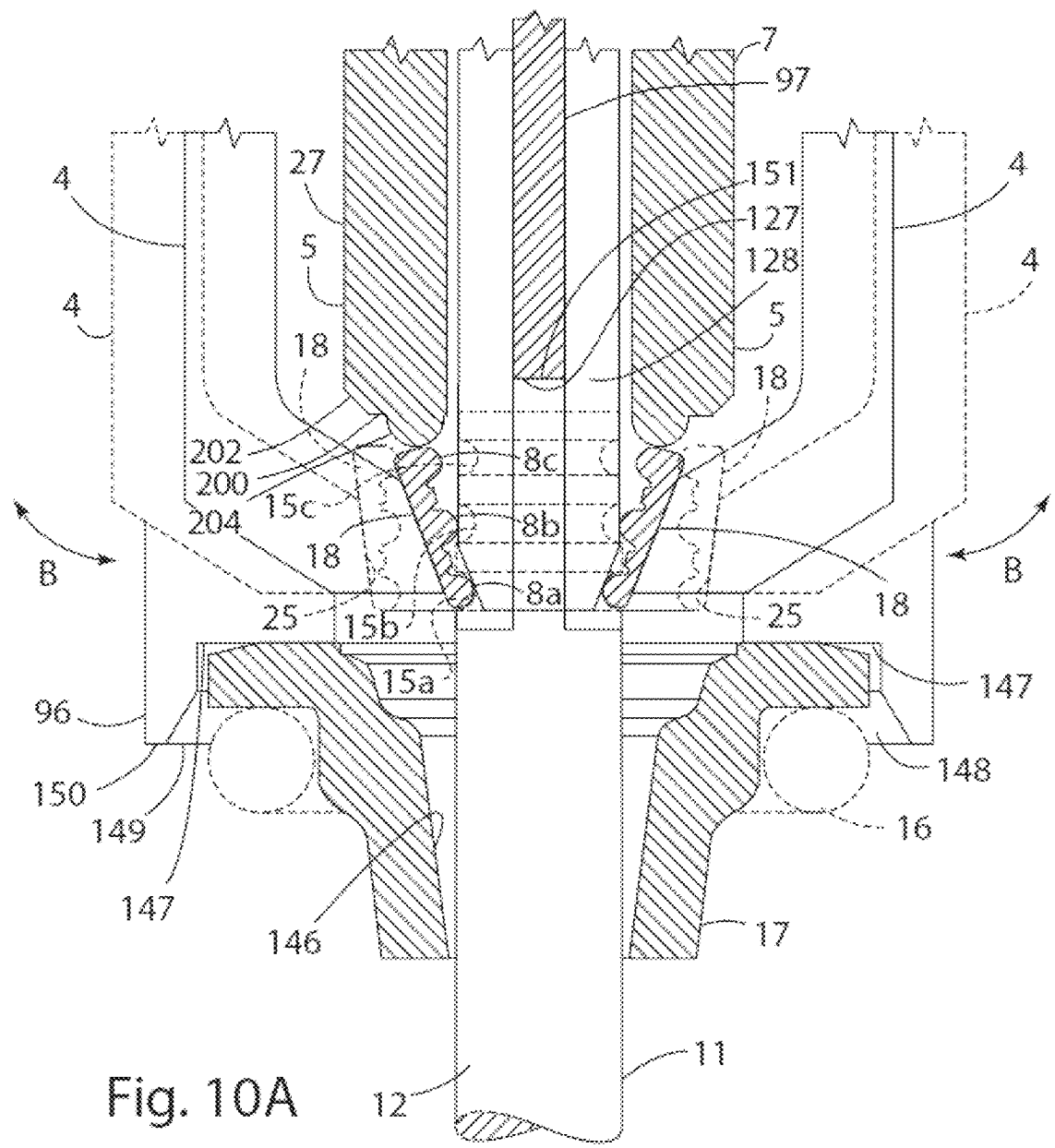
FIG. 10A is a partially fragmentary view of the device of FIG. 7 showing the jaws rotated outwardly.
Figure 10B:
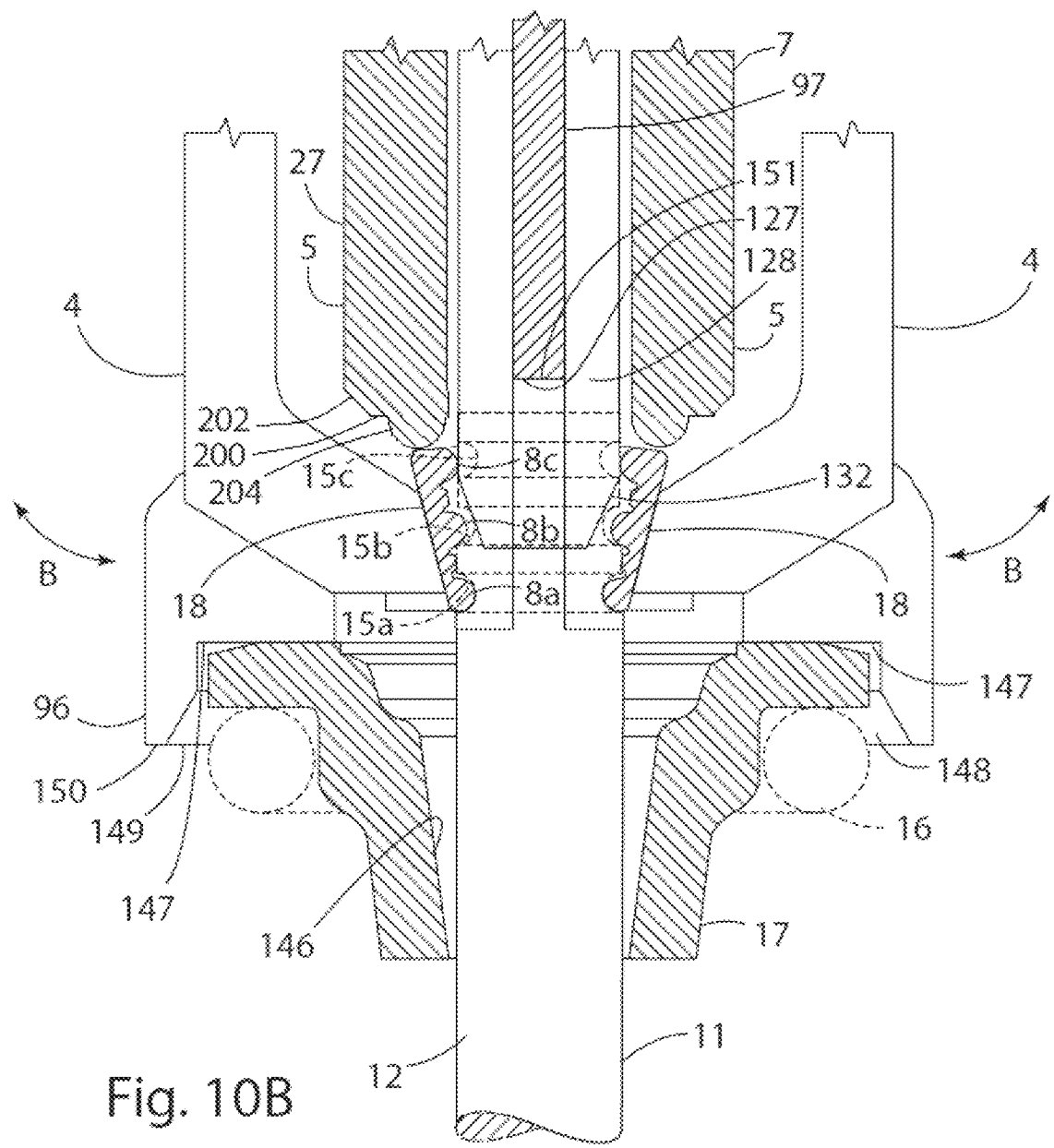
FIG. 10B is a partial fragmentary view of the device of FIG. 7 showing the jaws in a second engaged position.
Figure 10C:
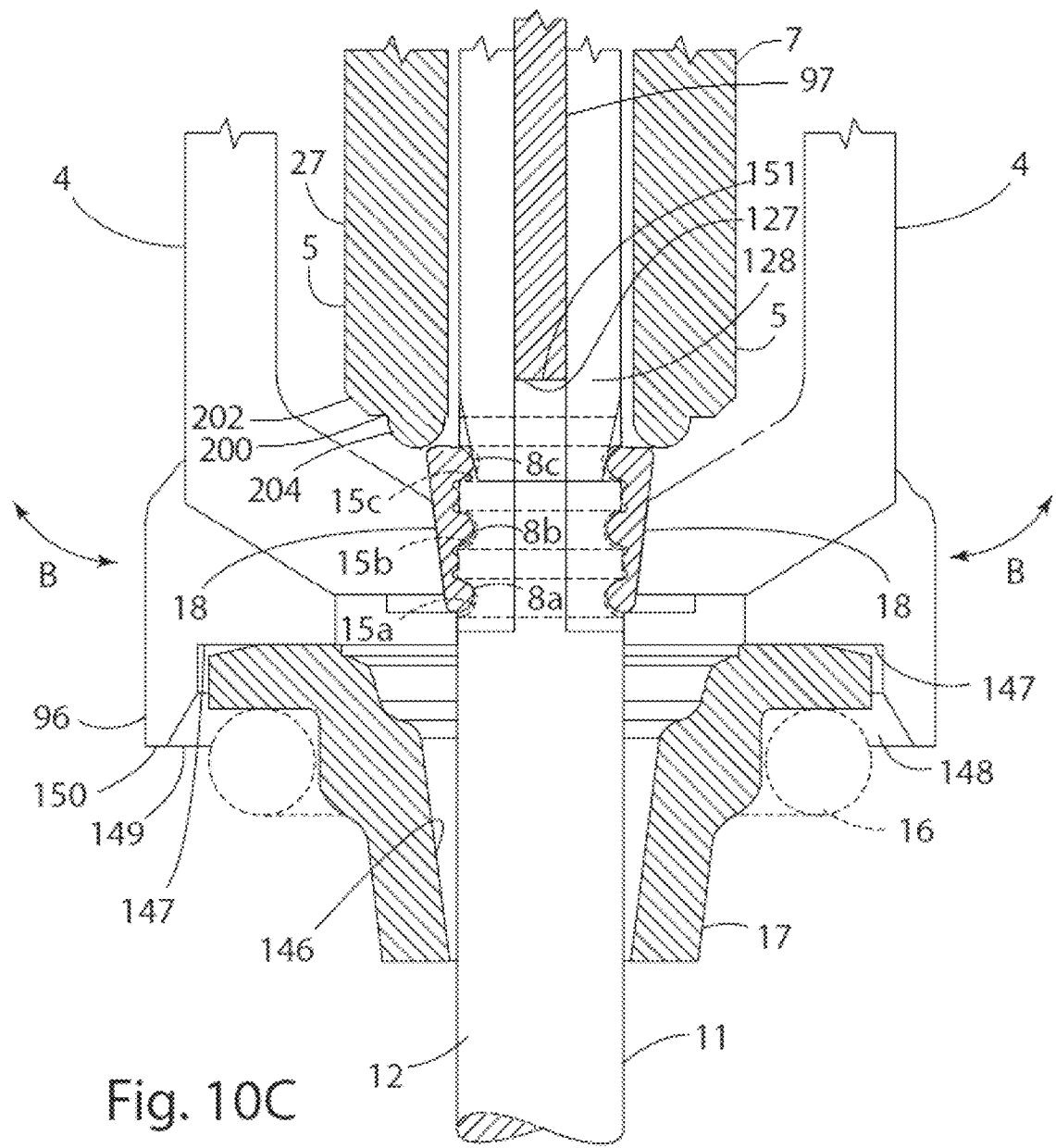
FIG. 10C is a partial fragmentary view of the device of FIG. 7 showing the jaws in a third engaged position.

With reference to FIGS. 9 and 10A, a pocket 148 is formed at a lower end 150 of the extension 95 of the main block 42. The pocket 148 includes a flat support surface 147, and a tapered or conical surface 149. The pocket 148 locates a valve spring cap 17 in position during operation of the device 1. During operation, a coil spring 16 is positioned over the valve stem 12 in contact with the valve spring cap 17 to thereby push the valve spring cap 17 into contact with the support surface 147 of the main block 42. An end surface 151 of the valve stem 12 is positioned against the end surface 128 of the web 123 to thereby vertically position the valve 11.

During operation, the head assembly 8 is aligned with a valve 11 positioned in the fixture 36, and the head assembly 8 is shifted linearly to bring lower end surfaces 155 (FIG. 11) of enlarged side portions 129 (FIGS. 12, 13) of the inserts 117 into contact with the valve spring cap 17 (FIGS. 7, 8) that is initially positioned on the valve spring 16, with the valve spring 16 in an uncompressed state on the cylinder head 38. As the head assembly 8 is shifted downwardly, the end surfaces 129 of the inserts 117 of the separator/guide plate 97 contact the cap 17 on the valve spring 16. As shown in FIGS. 9-11, when the valve spring 16 is fully compressed, the end surface 151 of the valve 11 may contact the edge surface 127 of the central web 123 of the separator/guide plate 97, between the prongs 126 of the pushrod 7 (see also FIGS. 12, 13).

When the valve spring 16 is compressed, a pair of the keys 18 are pushed along the passageways 3 under air pressure and/or gravity to a lower position (FIG. 9) wherein the two keys 18 of the pair are held apart by the lower end of the separator/guide plate 97. The pushrod 7 is then driven downwardly by the powered actuator 26 to rotate the guide members 70 outwardly and close off the passageways 3 to prevent additional keys 18 from traveling through the passageway portions 85 of the guide members 70 and thereby prevent additional keys from traveling down and contacting the pair of keys 18 that is about to be installed (FIG. 9).

The lower ends 6 of the pushrod 7 then contact the keys 18 and slide the keys 18 downwardly until the keys 18 are positioned vertically in the proper location relative to the end 14 of the valve 11, with the raised annular ridges 8a, 8b, 8c on the inside of the keys 18 aligned with annular grooves 15. Alternatively, the at least one of the raised annular ridges 8*a*, 8*b*, 8*c* may be positioned below the annular groove 15 along the length of valve stem 12, as described below. The surfaces 25 of the jaws 4 are initially positioned inwardly (FIG. 9). As the pushrod 7 pushes the keys 18 downwardly, the keys 18 contact the tapered surfaces 145 of the jaws 4, pushing the jaws 4 rotationally outwardly out of engagement with the keys 18 whereby the keys 18 are spaced apart by the outer surfaces 125 (FIG. 11) of the lower end of the plate 97.

The separator plate 97 is then retracted upwardly, permitting the jaws 4 to push the keys 18 inwardly into position on the end 14 of the valve 11. Significantly, the separator plate 97 axially positions the valve 11 relative to the keys 18 as the keys 18 slide into position, thereby ensuring that the keys 18 are properly positioned and therefore properly engage the valves 11. Specifically, the lower end of the separator plate 97 includes beveled guide surfaces 132 (FIG. 10B), while abutment ends 200 of the push rods 7 include a beveled edge 202 to abut the jaws 4, as described above, and a rounded surface 204, where the beveled guide surfaces 132 and the rounded surface 204 are each configured to abut the keys 18. In the illustrated example, the guide surfaces 132 are angled such that the keys 18 are allowed to gradually engage the annular grooves 15*a*, 15*b*, 15*c* of the valve 11 as the separator plate 97 is removed. More specifically, the guide surfaces 132 are angled such that, as the separator plate 97 is retracted upwardly, the first or lowermost ring 8*a* of each key 18 engages the first or lowermost groove 15*a* of the valve 11, while the separator plate 97 prevents the second and third rings 8*b*, 8*c* from engaging the corresponding grooves 15*b*, 15*c*. In this manner, the device 1 may be utilized to simultaneously align and install keys 18 to valves 11 where the length of the stem 12 varies between the various valves 11. This may be accomplished by the configuration of the separator plate 97 as described below, and specifically the beveled guide surfaces 132 thereof, which may allow the first ring 8*a* to abut an outer surface of the stem 12 along a length thereof below the lowermost groove 15*a*, or at a position between head 13 of the valve 11A, 11B and the groove 15*a* closest to the head 13, and then continue to engage/abut the outer surface until the first ring 8*a* is aligned with and received within the first groove 15*a*. Upward retraction of the separator plate 97 may be continued until the second and third rings 8*b*, 8*c* engage the second and third grooves 15*b*, 15*c* of the valve 11, respectively.

The head 8 is then shifted upwardly to allow the valves 11 to push the spring cap 17 upwardly into engagement with the keys 18. The pushrod 7 is then retracted, and the separator plate 97 is shifted downwardly to an extended position to thereby prepare for installation of the next pair of keys 18.

The keys 18 are introduced into the flex lines 39 (FIG. 1) by the automated feed system 40. The keys 18 slide downwardly through the flex lines 39 and into the passageway portions 66 in the outer blocks 58. The key components 18 slide downwardly due to gravity and/or air pressure and/or a vacuum applied to lower ends of the passageways 3. The keys 18 travel through the intermediate portion 57 of the passageways 3 formed in the support blocks 55 and the passageways 85 in the guide members 70. The pushrod 7 is moved downwardly upon actuation of the pneumatic cylinder 26, and the end corners 91 (see also FIG. 5) of the ends 6 of the pushrod 7 contact the inner surfaces 89 of the guide members 70, thereby rotating the guide members 70 outwardly to align the lower openings 78 of the guide members 70 with the lower passageway portions 136 as shown in FIG. 2. The outward rotation of the guide members 70 also causes the end surfaces 67 of the support blocks 55 to block the openings 86 in the guide members 70 to prevent entry of more keys 18 into the passageways 85.

The pushrod 7 continues moving downwardly, and the end portions 6 of the pushrod 7 push the keys 18 through the lower passageway portions 136. When the keys 18 reach the position shown in FIG. 9, the keys 18 may contact tapered, inwardly-extending surfaces 145 of the jaws 4. As the pushrod 7 continues moving downwardly, the key 18 may slide against the surfaces 145 of the jaws 4, pushing the jaws 4 outwardly to the position shown in FIG. 10. The keys 18 move downwardly into engagement with key-engaging surfaces 25 of the jaws 4, and the inward bias on the jaws 4 causes them to rotate inwardly, thereby shifting the keys 18 inwardly from the positions shown in FIG. 10A, to the position shown in FIG. 10B, to the position shown in FIG. 10C, to an installed position as shown in FIG. 8 wherein the keys 18 engage all of the grooves 15*a*, 15*b*, 15*c* at the upper end 14 of the stem 12 of the valve 11. The valve stem 12 is then moved downwardly, causing the keys 18 to slide downwardly into contact with the tapered/conical inner surface 146 of the valve spring cap 17. The spring bias acting on the jaws 4 holds the keys 18 in position on the valve stem 12 as the valve 11 is moved downwardly, thereby insuring that the keys 18 remain in position as they are moved into contact with the conical surface 146 of the valve spring cap 17.

The device 1 reliably positions the valve stem key 18 on the valves 11. The inward bias of the jaws 4 insure that the keys 18 remain in contact with annular grooves 15*a*, 15*b*, 15*c* formed at the upper end 14 of the valve stem 12 as the key components are moved into contact with the valve spring cap 17, while the beveled guide surfaces 132 of the separator plate 97 ensures proper alignment of the keys 18 with respect to the valve 11 such that the device 1 may be utilized to assemble valve assemblies with valves 11 having valve stems 12 of various lengths.

In an alternative embodiment, a plurality of devices 1 are support by a common support assembly 30*d*. The devices 1 are spaced along the support assembly 30*d* such that the devices 1 may simultaneously install a plurality of intake valves 11A and/or a plurality of exhaust valves 11B along a cylinder head 38. In the illustrated example, the support assembly 30*d* is supported by a six-axis robot 300, thereby allowing for repositioning of a single or multiple device 1 to be moved along and relative to the cylinder head 38 during the valve assembly process. Alternatively, this arrangement also allows for installation of the valves 11A, 11B without repositioning the cylinder head by way of the moveable fixture 36.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A device for assembling valve springs to a cylinder head of an internal combustion engine, the device comprising:
 a head assembly including upper and lower ends and defining an axis extending between the upper and lower ends, wherein the lower end is configured to compress a valve spring on a cylinder head to permit assembly of a spring retainer cap and retainer keys to a valve of the cylinder head, the head assembly including:
 a support structure;

a pair of elongated passageways configured to moveably support a pair of retainer keys for movement of the retainer keys from first ends of the passageways to second ends that are located adjacent the lower end of the head assembly;

a divider plate moveably interconnected with the support structure for powered reciprocating movement between extended and retracted positions, the divider plate having a lower end defining oppositely facing guide surfaces that are configured to moveably support a pair of retainer keys in spaced apart locations that permit an end of a valve to be positioned between the retainer keys when the divider plate is in the extended position;

a pair of jaws moveably connected to the support structure, the jaws having end portions that are selectively movable inwardly and outwardly relative the axis of the head assembly between inward and outward positions, wherein the end portions are biased towards the inward position, and wherein the end portions define inwardly-facing key-engagement surfaces configured to engage curved outer surfaces of a pair of retainer keys to push the retainer keys towards one another onto a valve stem upon movement of the divider plate from the extended position to the retracted position;

a powered actuator; and a push member operably connected to the powered actuator for powered movement between extended and retracted positions, wherein the push member is configured to engage a pair of retainer keys and move the retainer keys along portions of the passageways adjacent the second ends as the push member moves from the retracted position to the extended position;

wherein at least one of the retainer keys and the push member and shift the jaws outwardly as the push member moves to the extended position; and wherein the divider plate is configured to be retracted from a first position where the retainer keys are spaced from the valve stem, to a second position where an inwardly-extending first ring of each of the retainer keys engages a groove of the valve stem, and the separator plate prevents an inwardly-extending second ring of each of the retainer keys spaced from the first ring from engaging a second groove of the valve stem spaced from the first groove, to a fully retracted position where the second ring of each of the retainer keys engages the second groove of each of the valve stems.

2. The device of claim 1, wherein the divider plate includes a pair of beveled guide surfaces that are configured to engage the retainer keys and guide the retainer keys from the first position to the second position.

3. The device of claim 1, wherein the divider plate is configured to be retracted to a third portion between the second position and the fully retracted position where the second ring of the retainer keys engages the second groove of the valve stem, and the fully retracted position where the third ring of each of the retainer keys engages the third groove of the valve stem.

4. The device of claim 3, wherein the beveled guide surfaces are configured to guide the retainer keys from the second position to the third position.

5. The device of claim 1, wherein the divider plate is moveably interconnected with the support structure by a pair of elongated rod members that are selectively biased in a first direction by compressed air, and biased in a second direction by a pair of springs, whereby a pressure of the compressed air can be controlled to selectively shift the divider plate in the first direction.

6. The device of claim 5, wherein the support structure comprises a substantially rigid block of material having a pair of elongated bores, and wherein the elongated rod members of the divider plate are moveably received in the bores for reciprocating motion.

7. The device of claim 1, wherein the support structure comprises a substantially solid block of material, and wherein the jaws are pivotally connected to the substantially solid block of material.

8. The device of claim 7, further comprising:
a pair of control members moveably interconnected to the support structure for movement between open and closed positions, wherein the control members are configured to selectively close off the passageways when in the closed positions to selectively prevent retainer keys from traveling from the first ends to the second ends of the passageways.

9. The device of claim 8, wherein the control members are pivotally connected to the substantially solid block of material.

10. The device of claim 9, wherein the control members include elongated passageway portions therethrough having upper and lower opposite open ends, whereby rotation of the control members selectively closes off the open upper end of the passageway.

11. The device of claim 10, wherein the push member comprises an elongated pushrod slidably received in an elongated central opening in the block of substantially solid material, and wherein movement of the pushrod causes the pushrod to contact the control members and rotate the control members from an open position to a closed position to close off the passageways.

12. The device of claim 1, wherein the control members are biased towards the open position, and include lower ends that are biased inwardly, and wherein the pushrod slidably contacts the lower ends of the control members to thereby rotate the lower ends outwardly against the bias.

13. The device of claim 12, wherein the jaws include U-shaped upper portions and wherein a portion of the control members is received between the U-shaped portions.

14. The device of claim 13, wherein the pushrod defines an upper end, and a bifurcated lower end having two elongated prongs defining a space therebetween, and wherein at least a portion of the divider plate is received between the prongs of the pushrod when the pushrod is in the extended position.

15. The device of claim 14, wherein an insert is attached to the lower end of the block member, and wherein the divider plate includes an elongated lower end having a slot that moveably receives a center portion of the insert as the guide plate is shifted vertically.

16. The device of claim 15, wherein the insert comprises a relatively thin center web, and vertically-extending opposite outer portions, and wherein the central web defines a lower surface that contacts an upper end of a valve stem in use.

17. The device of claim 16, wherein the outer portions of the insert include inwardly facing surfaces directly adjacent the lower edge of the central web to form a gap therebetween that receives an upper end of a valve stem whereby the insert positions the valve stem vertically and horizontally.

18. A device for assembling valve springs to a cylinder head of an internal combustion engine, the device comprising:
a head assembly including upper and lower ends and defining an axis extending between the upper and lower ends, wherein the lower end is configured to compress a valve spring on a cylinder head to permit assembly of a spring retainer cap and retainer keys to a valve of the cylinder head, the head assembly including:

a support structure;

a pair of elongated passageways configured to moveably support a pair of retainer keys for movement of the retainer keys from first ends of the passageways to second ends that are located adjacent the lower end of the head assembly;

a divider plate moveably interconnected with the support structure for powered reciprocating movement between extended and retracted positions, the divider plate having a lower end defining oppositely facing guide surfaces that are configured to moveably support a pair of retainer keys in spaced apart locations that permit an end of a valve to be positioned between the retainer keys when the divider plate is in the extended position;

pair of jaws moveably connected to the support structure, the jaws having end portions that are selectively movable inwardly and outwardly relative the axis of the head assembly between inward and outward positions, wherein the end portions are biased towards the inward position, and wherein the end portions define inwardly-facing key-engagement surfaces configured to engage curved outer surfaces of a pair of retainer keys to push the retainer keys towards one another onto a valve stem upon movement of the divider plate from the extended position to the retracted position;

a powered actuator; and a push member operably connected to the powered actuator for powered movement between extended and retracted positions, wherein the push member is configured to engage a pair of retainer keys and move the retainer keys along portions of the passageways adjacent the second ends as the push member moves from the retracted position to the extended position;

wherein the divider plate is configured to allow a plurality of inwardly-facing rings of each of the retainer keys to sequentially engage a plurality of grooves of the valve stem as the divider plate is moved from the extended position to the retracted position and the retainer keys are shifted inwardly toward one another by jaws.

* * * * *

UNITED STATES PATENT AND TRADEMARK OFFICE
CERTIFICATE OF CORRECTION

PATENT NO. : 11,148,238 B2
APPLICATION NO. : 16/546790
DATED : October 19, 2021
INVENTOR(S) : Timothy P. Coggins et al.

It is certified that error appears in the above-identified patent and that said Letters Patent is hereby corrected as shown below:

In the Specification

Column 1, Line 35:
Delete "a" (second occurrence)

Column 2, Line 28:
"of" (second occurrence) should be — or —

Column 3, Line 1:
"positon" should be — position —

Column 4, Line 25:
"elongate" should be — elongated —

Column 5, Line 66:
"member" should be — members —

Column 7, Line 62:
"serves" should be — serve —

Column 10, Line 28:
"insure" should be — ensures —

Column 10, Line 33:
"ensures" should be — ensure —

Column 10, Line 38:
"support" should be — supported —

Signed and Sealed this
Seventeenth Day of May, 2022

Katherine Kelly Vidal
*Director of the United States Patent and Trademark Office*

CERTIFICATE OF CORRECTION (continued)
U.S. Pat. No. 11,148,238 B2

In the Claims

Column 11, Claim 1, Line 16:
"movable" should be — moveable —

Column 11, Claim 1, Line 34:
Delete "and"

Column 11, Claim 3, Line 52:
"portion" should be — position —

Column 13, Claim 18, Line 18:
Before "pair" insert -- a --

Column 13, Claim 18, Lines 19-20:
"movable" should be — moveable —